Figure 1:
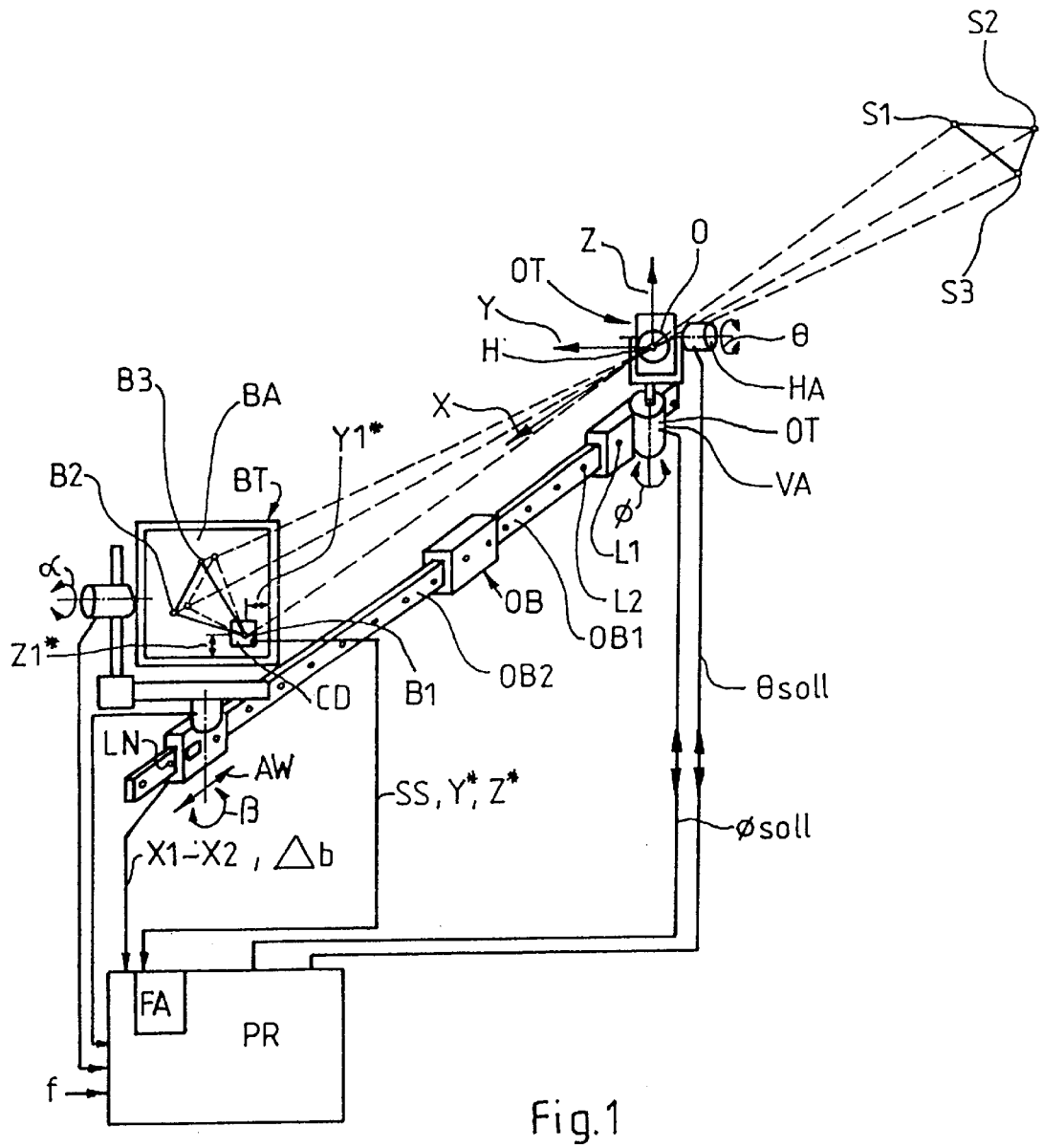

United States Patent

Donner

Patent Number: 5,809,349
Date of Patent: Sep. 15, 1998

[54] CAMERA WITH ADJUSTING DEVICE FOR OBJECTIVE LENS AND IMAGE CARRIER AND A FOCUSING PROCESS

[76] Inventor: Wilfried Donner, Humboldtstrasse 16, D-33615 Bielefeld, Germany

[21] Appl. No.: 860,852
[22] PCT Filed: Jan. 10, 1996
[86] PCT No.: PCT/EP96/00088
  § 371 Date: Jul. 10, 1997
  § 102(e) Date: Jul. 10, 1997
[87] PCT Pub. No.: WO96/21882
  PCT Pub. Date: Jul. 18, 1996

[30] Foreign Application Priority Data

Jan. 10, 1995 [DE] Germany ............ 195 00 507.4

[51] Int. Cl.$^6$ .................. G03B 5/00; G03B 5/08; G03B 13/36
[52] U.S. Cl. .................. 396/89; 396/342; 396/437
[58] Field of Search .................. 396/89, 342, 50, 396/437, 79, 80

[56] References Cited

U.S. PATENT DOCUMENTS 5,027,143  6/1991  Clark, III et al. .

FOREIGN PATENT DOCUMENTS 34 33 412  4/1985  Germany .

*Primary Examiner*—W. B. Perkey
*Attorney, Agent, or Firm*—Browdy and Neimark

[57] ABSTRACT

A camera is described with objective lens and image reception carrier equipment and a focussing process. From related extension measured distances (x1–x2, x2–x3, δb), final adjusted, set-point focus values ($\theta_{soll}$, $\Phi_{soll}$) are obtained in the course of the focussing of various image points (B1, B2, B3) for a multiply pivotable, bellows camera which produces the pivoting angles ($\alpha$, $\beta$, $\theta$, $\Phi$), the latter used for a double focussing compensation; by this means, the direct making of an exact spatial interval distance measurement between the objective lens carrier (OT) and the and image carrier (BT) is dispensed with, since at least a relatively accurate extension measurement (δb) at a predetermined objective lens setting is obtained and evaluated.

The optical bench (OB) can be equipped with a raster arrangement for the image carrier (B1), the objective lens carrier (OT) and be constructed in sections (OB1, OB2).

14 Claims, 5 Drawing Sheets

CAMERA WITH ADJUSTING DEVICE FOR OBJECTIVE LENS AND IMAGE CARRIER AND A FOCUSING PROCESS

The invention concerns a focusing process for a camera, said camera:

having an objective lens carrier and an image carrier, which are maintained positionally relative to one another in a straight line optical bench direction in which the spatial interval between them is variable, wherein the said interval changes are signaled to a microprocessor, being equipped with an objective lens carrier and an objective lens secured to pivot about two axes, said axes being vertical to one another and to an optical bench, the two respective objective lens angles and the focal length of said lens being input to a processor, possessing an image carrier in which an image screen, namely a frosted glass plate is secured, which screen is moveable about two axes vertically disposed to one another and to the direction of the bench, the two respective image reception angles being sent to the processor, having in the image screen, a focusing adjustment sensor, which signals a degree of focus, and is positionable in two image reception coordinates which, together with the focus value, are conducted to the processor, further possessing at least three select image point areas, which lie in a secondary image plane for the simultaneous adjustment of the focus, having these said image point areas on the image screen subjected to determination of their respective image screen coordinates by means of a change in the interval between the image carrier and the objective lens sequentially for each area through focus adjustment, and the said positional changes of the image carrier are input to the processor, obtaining, by means of the input data so collected, from the processor computer a determination of the positional parameters of the image screen as well as of the secondary image from which, together with a further image parameter necessary for computation, this latter originating in the solution of image equations, there will be calculated fixed adjustment values suitable for the pivoting of the objective lens carrier along with a value for the adjustment of the interval between the carriers of the image and the objective carrier, the results thereof being made available, so that the new image plane adjusted by these set-point values comes as close as possible to coinciding with the image screen.

A camera of this type is brought into common knowledge by DE 34 33 412 C2. In this case, the objective lens focal length, an image scale, based on the spatial coordinates of the three select real image point areas, which were determined from the optical imagery of a scale of the image, to which purpose a focus sensor serves as an aid, the angle adjustment of the objective lens and image screen inclinations and degrees of deviation, and the spatial interval between the principal plane of the objective lens to the image screen, are either input to the processor by a keyboard or provided direct with measured values.

From these data the processor computes the set point signal for the adjustment angle and the said interval. In this computation, the processor makes use of the Law of Scheimpflug according to which, the objective lens plane, the plane to which the real image belongs and the plane to which the focused image points belong, must mandatorily intersect in one straight line.

Thus, in accord with a preset adjustment, the selected image point area of the real subject, by means of the so called double focus compensation, is imaged as sharply as possible. With this apparatus, in addition the absolute space coordinates of the image points and the structural data of the imagery optics are required as starting point values for a final solution of the image equations. This is in order to find such a position of the image screen in relation to the setting of the objective lens, that the select image point areas lie with the sharpest possible focus in the image screen. This requires a substantial array of means of measurement having high requirements as to precision. Moreover, the Law of Scheimpflug, which was employed, is valid only for the imagery in a paraxial zone of a thin lens, making it of little meaning in practice.

Thus, it is the purpose of the invention, to achieve an automatic focus adjustment of a real image, using the camera described in the introductory passages, employing double focus compensation with the reduced demand for measurement equipment, simplified apparatus and an objective lens acceptable in practice.

The accomplishment of this purpose lies therein, in that one of the objective lens adjustment parameters can be altered in given quantity, and as this is carried out, for a selected image point, the extension difference of a extension adjustment apparatus lying between its two focus adjustments in the bench direction, is measured. This brings about a first set of the of the image equations by the use of the original objective lens adjustment parameters and an undetermined image distance, and a further set of image equations with the inclusion of the now varied objective lens adjustment parameters and the undetermined image distance. These two sets are equalized for the image distance as altered by the extension difference and solved for the set-point adjustment values. Another approach to solution is the functional derivation of the image comparisons with reference to the objective lens positional parameters and involving the prior adjustment changes made from time to time along with the measured extension difference, all included in the said derivations, and, in accord with the set-point parameters, solving for the said undetermined object distance.

Advantageous embodiments are described in the subordinate claims.

The new process renders the absolute distant measurement between the objective lens carrier and the image carrier superfluous. It now suffices, that the respective angular measurement equipment is at hand and the relative measurement of the interval, that is, the extension changes in the course of the various focus placements, as well as the coordinate determinations on the screen, are to be available.

The adjustment process may be summarized in the following sequence of operations:

The photographer adjusts the perspective by deflecting the screen and subsequently carries out a rough pre-focusing of the image. He does this generally through altering the extension and in some cases by tilting the objective lens. The parameters "$a_m$" and "$b_m$" of the screen, which determine its normal vector, but not, however, its distance from the objective lens, which is not necessary here, as well as the adjusted deflection which is to be included, from the screen and X-axis, yield the following:

$$\sin\theta = -\frac{f\left(a_m^2 - a_m\frac{a_0 f + d_0\cos\theta_0\cos\phi_0}{f - d_0\sin\theta_0} + b_m^2 - b_m\frac{b_0 f + d_0\cos\theta_0\sin\phi_0}{f - d_0\sin\theta}\right)}{\frac{d_0 f}{f - d_0\sin\theta_0}(1 + a_m^2 + b_m^2)} \pm \tag{1}$$

$$\left[f^2\left[\left(a_m^2 - a_m\frac{a_0 f + d_0\cos\theta_0\cos\phi_0}{f - d_0\sin\theta_0} + b_m^2 - b_m\frac{b_0 f + d_0\cos\theta_0\sin\phi_0}{f - d_0\sin\theta_0}\right)^2 - \right.\right.$$

$$a_m^2 + 2a_m\frac{a_0 f + d_0\cos\theta_0\cos\phi_0}{f - d_0\sin\theta_0} -$$

$$\left(\frac{a_0 f + d_0\cos\theta_0\cos\phi_0}{f - d_0\sin\theta_0}\right)^2 - b_m^2 + 2b_m\frac{b_0 f + d_0\cos\theta_0\sin\phi_0}{f - d_0\sin\theta_0} -$$

$$\left.\left.\left(\frac{b_0 f + d_0\cos\theta_0\sin\phi_0}{f - d_0\sin\theta_0}\right)^2\right] - \left(\frac{d_0 f}{f - d_0\sin\theta_0}\right)^2\right]^{\frac{1}{2}} \times$$

$$\left[\frac{d_0 f}{f - d_0\sin\theta_0}(1 + a_m^2 + b_m^2)\right]^{-1}$$

$$\sin\phi = \frac{b_0 f + d_0\cos\theta_0\sin\phi_0 - b_m(f - d_0\sin\theta_0) - b_m d_0\sin\theta}{d_0\cos\theta} \tag{2}$$

$$x_b = -\frac{d_0 f}{f - d_0\sin\theta_0 - \frac{a_0 f + d_0\cos\theta_0\cos\phi_0}{f - d_0\sin\theta_0}d_0\cos\theta\cos\phi} \tag{3}$$

angles $\theta_o$ and $\Phi_o$ of the objective lens are read off by the built-in goniometer in the computer.

The determination of the coordinates $b_i = (x_i, y_i, z_i)$ from at least three image points by means of focusing is done with the aid of a CCD-sensor (or the equivalent thereof); meanwhile, the camera objective lens is swivelled through the angles $\theta_o$ and $\Phi_O$. The X-axis is in this case, that axis parallel to the optical bench of the camera, and which penetrates the center of the objective lens. The Y-axis runs vertically thereto in a horizontal manner while the Z-axis stands in a vertical position.

The alignment of that plane, for which the sums of the square of the intervals of the measured image points are at a minimum. The parameters for this original image plane are $a_o$, $b_o$, $d_o$, which is then given through: $=a_o x + b_o y + d_o$ The determination of the distance of image b from the difference in the extension $\delta b$ by focusing a specific image point at a given objective lens pivoting angle change—in accord with the equations (5) to (7), The determination of the distance of image b with an unpivoted objective lens in accord with equation (8), The determination of the z-axis parameter $d_o$ by equation (9), The computation of the set-point objective lens adjustment angles $\theta_{soll}$, $\Phi_{soll}$ and the screen intercepts $xb_{soll}$ with the X-axis in accord with the equations (1), (2), and (3).

The starting screen plane will be depicted in the object space. The plane so produced, upon varied objective lens pivoting, will be re-imaged in the image space with the purpose, of aligning the newly obtained image plane parallel to the installed screen. The necessary objective lens adjustment angles, $\theta_{soll}$, $\Phi_{soll}$ as well as the screen intercept $xb_{soll}$ The image compensation of thin lenses serves exclusively as the physical basis for the above. It is yet to be proven, that the process lends itself in a simple manner also for the application of optional objective lenses, the optical characteristics of which may be modified through their focal length as well as the positioning of their two principal planes.

The objective lens, is now pivoted about the angles $\theta$ and $\Phi$ (in this case, $\theta = \Phi = 0$, precisely the situation, in which the objective lens is positioned vertically on the optical bench of the camera.) The screen is to be displaced parallly, in such a manner that it intersects the X-axis at the value xb.

Generally, also the following transformation of the input data is carried out:

$$(\vec{b}_i, a_m, b_m, \theta_0, \phi_0) \rightarrow (a_0, b_0, d_0, a_m, b_m, \theta_0, \phi_0) \rightarrow (\theta, \Phi, I_l) \tag{4}$$

The two image equations of the original image plane and the new image plane which come to lie in the screen, are drawn from the invariant real image plane, on which account the two object planes are directly correlated. In this way, equations arise, which are not based on the principle of Scheimpflug, since no real image plane is defined, nor are the equations defined for an intersecting straight line between the real and the objective planes as well as the objective and image planes.

In the relationships (1), (2) and (3), for the adjustment of the camera, the following parameters of the original image plane, the screen and the objective lens, $a_o$, $b_o$, $a_m$, $b_m$, $\theta_o$, $\phi_o$ are quite easy to determine : $a_m$, $b_m$, $\theta_o$ and $\phi_o$ are available directly from the readout from the standard applied goniometer, and $a_o$, and $b_o$, from the measurement of the extension upon focusing the image point Bi. The measuring of the further parameter $d_o$ of the original image plane, however, does not evoke any insurmountable technical problems, except that the absolute value of the extension for each of the points Bi must be defined very precisely (i.e. on the basis of 50 . . . 100 $\mu$m tolerance). Since the value of the extension length runs to as much as one meter or more, this means that the interval of the image point Bi from the objective lens must be directly measured within a possible error of maximum 0.1 promille. This is indeed possible, but technologically somewhat involved, on which account we have developed an indirect process for the determination of the extension length. Therefore, in accord with the invention, an indirect determination of this parameter has been undertaken.

The fact has been made use of, that the image length b of an imaged object point S from the objective lens changes when the lens is pivoted. The dimension of this image length variation δb depends in an unquestionable manner on the distance of the subject to lens distance s of the point S, so that the value of x can be determined from δb and the adjustment angle θ which was used. If s is known, the absolute value of b can be determined directly from the image distance equation. The absolute error for the value of b lies in the general range of the measurement error of the extension difference δb, which is very exactly determinable (up to ca. 50 μm) so that the relative error does not overstep the allowable limit.

This method is particularly simple, if one only pivots the objective lens about the Y-axis through the angle θ, (that is, I=0) and brings into play an object point S, which lies in the XY-plane. Then the interval of this point from the objective lens plane is given solely through its image distance s and the adjustment angle θ by:

$$\gamma = \frac{s \cos\theta}{f}$$

Valid for the computation of the image distance b of the image point S is:

$$b(s, \theta) = \frac{s}{1-\gamma} = \frac{fs}{fs - s\cos\theta} \quad (5)$$

The extension difference δb (s, θ) is defined by $$\Delta b(s, \theta) = b(s, 0) - b(s, \theta) = \frac{fs}{f-s} - \frac{fs}{f-s\cos\theta} \quad (6)$$

From which is derived the following expression for the distance s of the real subject:

$$s = \left[ \frac{\Delta bf(1 + \cos\theta) \pm \sqrt{\frac{(\Delta bf(1 + \cos\theta))^2 - }{4bf^2(\Delta b\cos\theta - f(1 - \cos\theta))}}}{2(\Delta b\cos\theta - f(1 - \cos\theta))} \right] \quad (7)$$

Only the solution employing the plus sign for the square root is relevant, because only this yields a value s=f, which leads to a real image of the point. The image distance of the point for θ=0, measured in relation to the extension differential δb, can be determined from:

$$b(s, \theta = 0) = \frac{fs}{f-s} \quad (8)$$

It is now possible, to produce the absolute values of all other measured relative extensions (i.e. the x-coordinates of the image point Bi which is to be sharply imaged). This can be done without actually measuring any image distance directly, since the X-axis is now provided with a defined zero point. The y- and z- coordinates are simply to be derived from the position of the moveable CCD chip on the screen, the X-axis position there and the pivot angles α, β of the screen. From the now absolute definable intercept point of the oringinal image plane with the X- axis, $x_o$, the Z-axis intercept may be found by $$d_o = -a_o x_o \quad (9)$$

and input into the equations (1), (2), and (3).

The precision of the process can be increased even to a higher degree, in that one has not only one, but several extension differentials measuring different adjustment angles θ and obtaining from these, values for s.

If, during the pivoting of the objective lens, the CCD chip is always maintained, by means of appropriate motorized control, on the tie line between the objective lens center and the start position (θ=O ), a great number of δb-values for many different values of O can be determined during the objective lens pivoting procedure, whereby the precision becomes very great for the obtained values of the subject distance.

Should the occasion arise, that no appropriate object point which lies in the XY-plane is available, naturally, any optional object point may be used; the calculation, however, becomes a bit more complicated, since the interval of the point from the plane of the objective lens now also depends on its relationship to the Z-axis. The following equation serves this purpose:

$$\gamma = \frac{1}{f} (s\cos\theta - z_s \sin\theta) \quad (10)$$

and from this:

$$\Delta b(s, z_s, \theta) = fs \left( \frac{1}{f-s} - \frac{1}{f - s\cos\theta - z_s \sin\theta} \right). \quad (11)$$

It is necessary that there are at least two values for δb upon measuring different adjustment angles θ; with the readings of δb (θ) so obtained, then the equation (11), by means of variations of the free parameters s and $z_s$ be applied. The parameter $z_s$ is no longer needed, from s, in accord with (8), the image distance b (θ=O) can be determined. The exactitude of the applied parameter increases, of course, with the number of the measured values; also, it is possible here, to carry out the measurements very quickly by means of automatic back-check on the CCD-chip for very many values of θ.

Going from the fact, that during the determination of the extension differentials, the measuring CCD must always be set at the same position in the image, this proves useful in that one requires the complete information which the focusing process delivers. The process is based on the principle, that for the observed image region, a focusing value quantity is produced, which is dependent upon the interval of the measuring CCD (in the x direction) from the focus and is at a maximum when focusing is achieved. Outside of the focus, the number is a value for the interval of the CCD from the focus point. If one makes the most of this, one need only once, at the beginning, to run through the area of the focus, in order, for the observed image region, to ascertain the run of the focus measuring numbers in dependency of the relative position on the X-axis. From the lessening of the focus measuring number upon pivoting the objective lens, then the decision can quickly be made regarding the focus and then directly on the extension difference, without being required to refocus anew from time to time. This method of procedure enables a quicker measuring of the extension difference from δb in relation to the pivot angle θ of the objective lens.

The method presented here makes it possible to determine solely from the image information, all necessary parameters. In addition, there is avoided the determination of the image distances of the focussed, repetitively given image points through direct length measurement, which requires much time and trouble from a technical standpoint, and hence is costly to carry out. Instead of this, the object distance of a principally optional subject point is computed through the measurement of the image distance of its image point at various objective lens adjustments and from this the absolute value of the image distance is determined in the case of a non-pivoted objective lens. The X-axis of the "bench fixed" camera-coordinate system is also provided with a zero point, the interval of which from the objective lens is very exactly known and relative to this, all further extension differentials can be measured with a high degree of exactness. The active length capacity of the displacement pickup can be only a few cm long.

Additionally, all problems are avoided, which can come up upon a direct interval length determination from thermal expansion of the optical bench or from the not entirely exact combination of a sectional optical bank which may involve several components. It is not at all important, whether the objective lens and image standards are generally connected with one another. The intervals, which in the screen plane must be still directly and absolutely determined (all lengths in y* and z* directions), lie in a cm-range and on this account are likewise easily determined by an economical motion pickup and within the required limits of precision.

It is common knowledge, that the so-called migration of the image point leads to undesirable perspective variation. This can be avoided by focusing with double focus compensation, when a thin lens is pivoted around such an axis that it intercepts the optical axis. On this account, in the case of the normally available mechanical pivot axes offset to the optical axis, virtual pivoting about the intersecting virtual axes is carried out, for which complicated compensation pivoting and displacement are necessary. In this case, undesired migration of the objective lens standard often occurs which leads to reaching the border position. Furthermore, often an undesired strong migration of the entire image to be focused occurs in the image field of the screen.

The migration occurs in still greater magnitude for the conventional objective lens as installed in practice, the image scaling behavior of which is described by means of good approximation by means of two principal planes. In this case, exhaustive computations show that migration can be avoided, if the pivoting axes intersect the optical axis in an area centrally located between the main plane and the main plane H'. The most favorable location of the intercept point of the axes is progressively advancing toward the main objective lens plane H' from the midpoint between the main plane, following the sequence: macro lens, normal objective lens II, normal objective lens I and wide angle objective lens.

Cognizance of these facts can be used to an advantageous simplification for objective lens adjustment, in that each objective lens is installed in the objective lens standard in accord with its optimal pivoted position which avoids migrations by means of an insert which holds the objective lens entry plane satisfactorily axially disposed at the receiving plane of the standard. By this means, with the pivoting of the standard, each installed objective lens moves about the optimal pivoting axis at any time without further compensation adjustments, so that migration is considerably reduced. The employment of this simple adapter insert simplifies not only the adjustment of the objective lens, but it also simplifies, in many cases, the focusing of an image point when a pivoting of the objective lens is undertaken.

Further, the measured differential extension values, which are of use in image computation, are well correlated to the respective pivoting angles, an advantage which allows correspondingly exact computation results.

The employment of the objective lens adapter insert is advantageous and inventive, independently of the use in the automatic adjustment system, since even with a manual, or semiautomatic adjustment of the objective lens, the up to now inescapable migrationing of the image is avoided thereby.

DESCRIPTION WITH ILLUSTRATION REFERENCES

Figure 2:
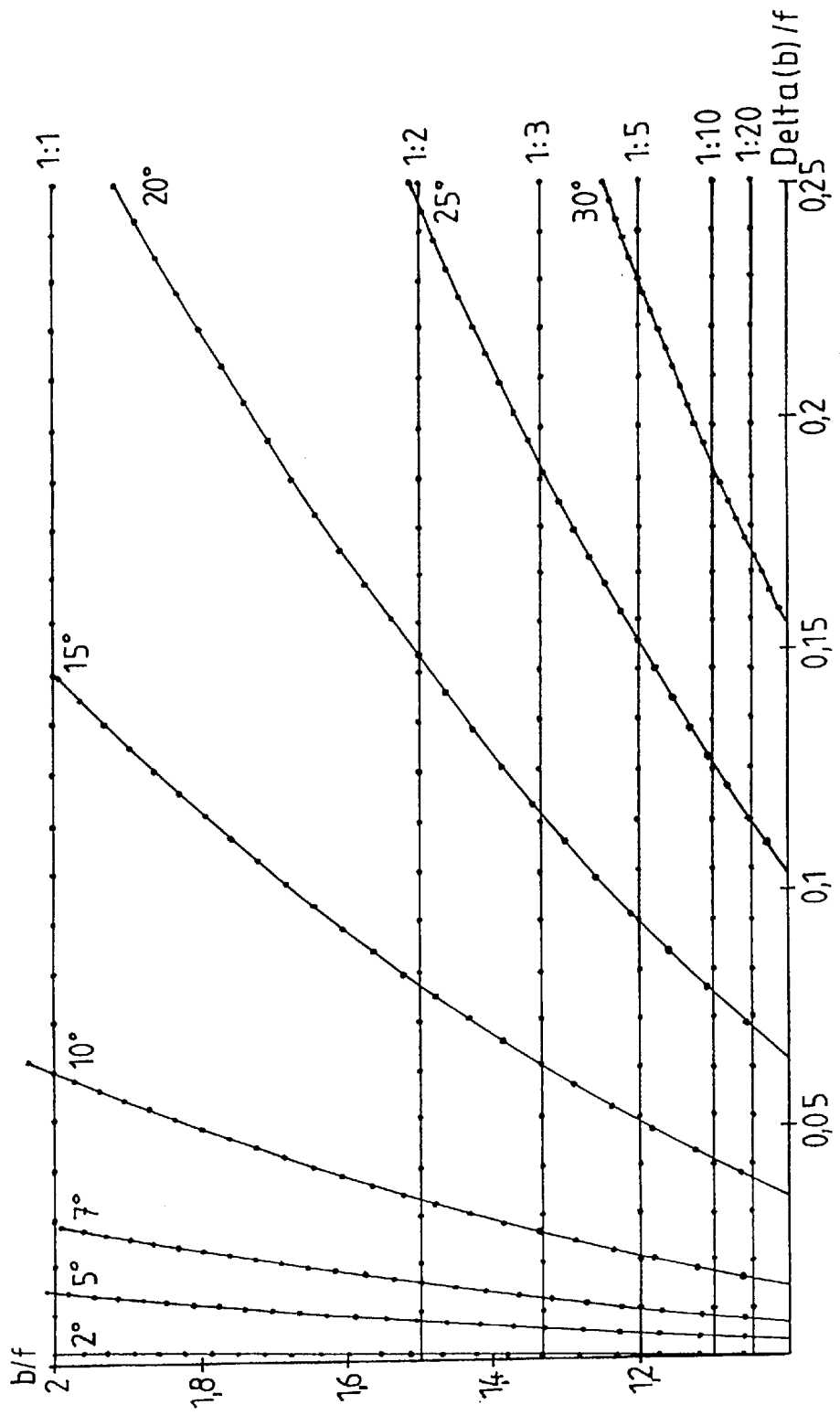
Figure 3:
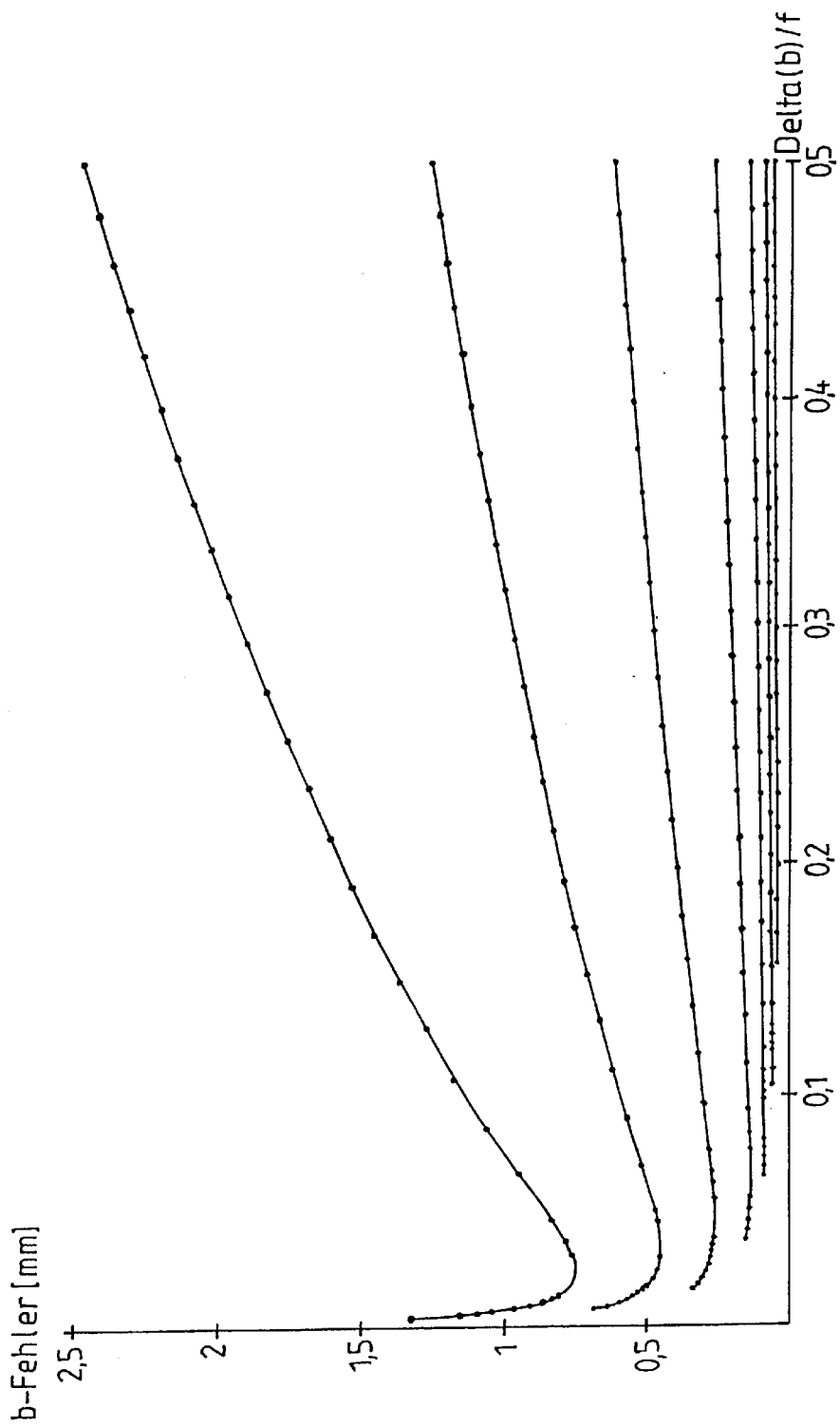
Figure 4:
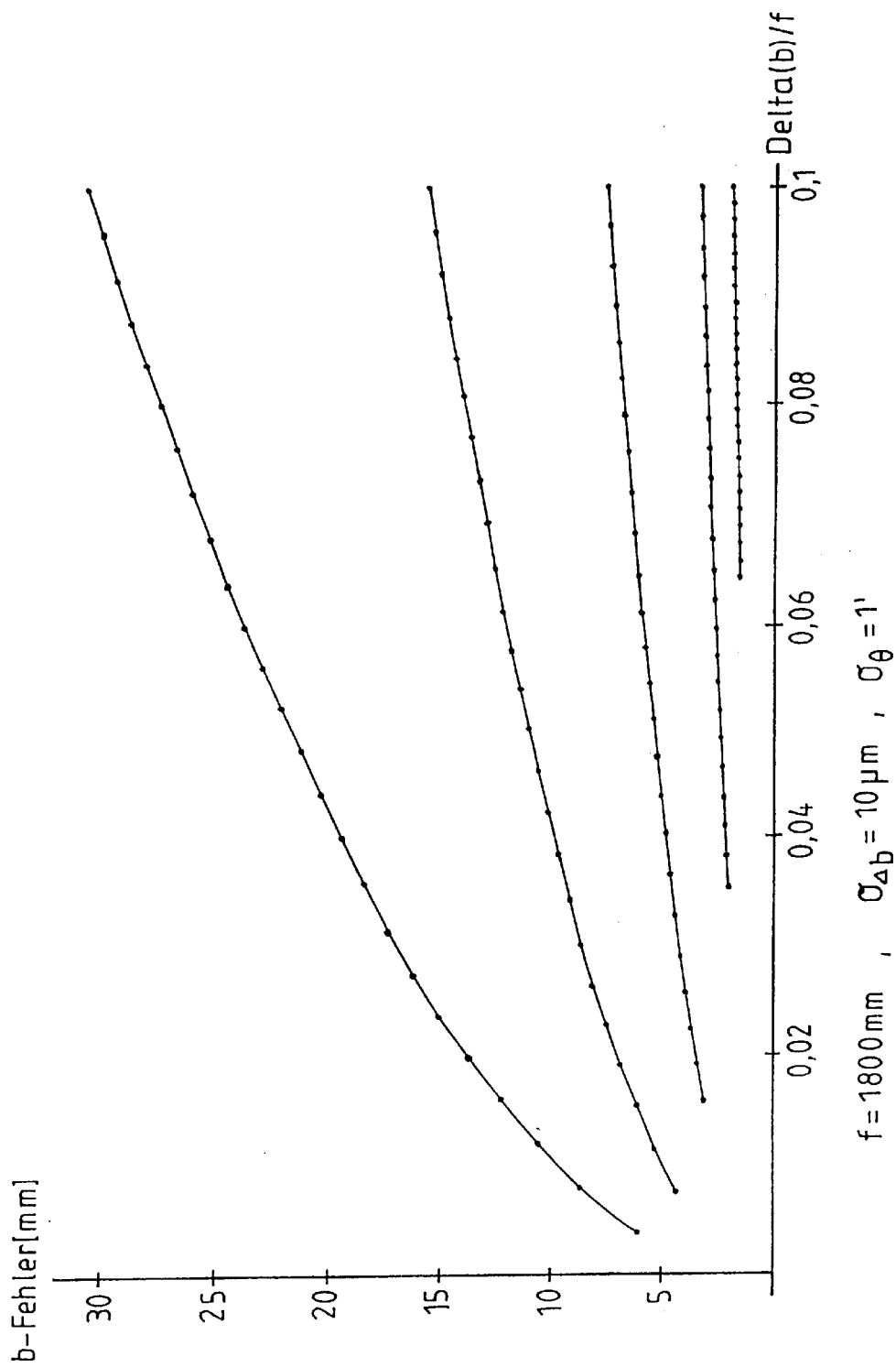
Figure 5:
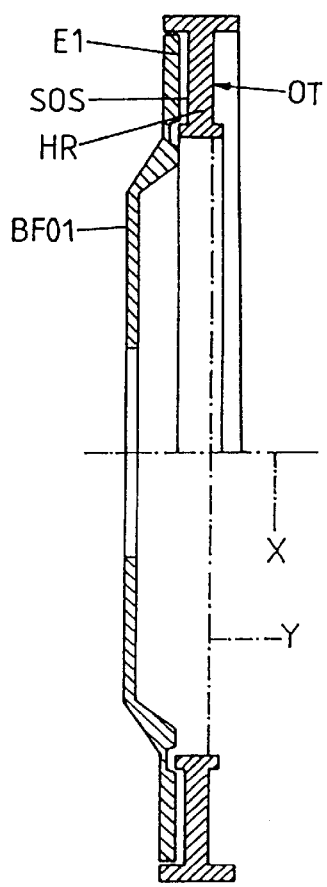
Figure 6:
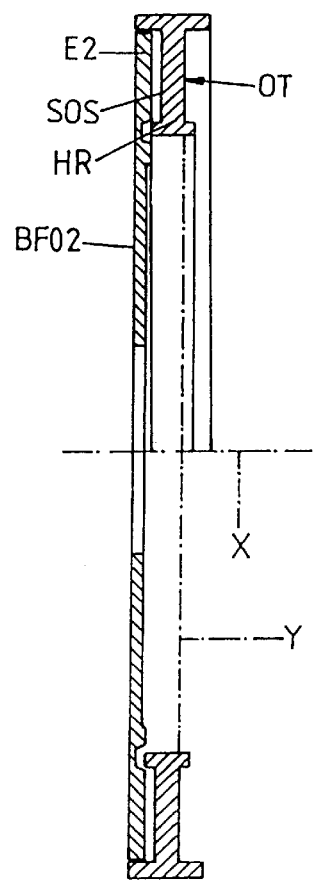
Figure 7:
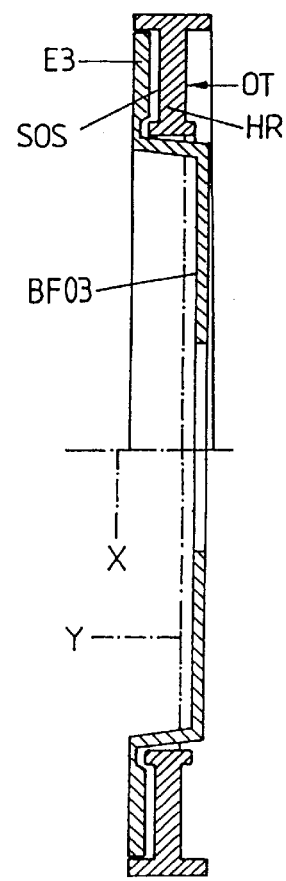

Advantageous embodiments are presented in the FIGS. 1 to 7, wherein:

FIG. 1 shows the camera in a simplified presentation, without bellows and with a schematic control apparatus, FIG. 2 presents the functional dependency of the image distance on the extension difference upon various pivoting angles of an objective lens with normalized focal length, FIG. 3 exhibits absolute error of the focal length upon given measuring errors for a 65 mm objective lens at varied pivoting angles, FIG. 4 shows image distance error for a 1800 mm objective lens, and FIGS. 5, 6 and 7 show an objective lens standard frame with various adapter inserts.

FIG. 1 illustrates a camera with an optical bench (OB), which can also be assembled from several sections. Upon this, an objective lens carrier (OT) is mounted, which carries an objective lens (O), which is secured in such a manner that it can pivot about two axes (Y, Z). The pivoting angles ($\theta$, I) are signaled to a processor (PR) by means of a goniometric pickup. If necessary, electrically controlled objective lens pivoting drives are provided (HA, VA) which are regulated by the processor (PR).

Further, on the optical bench (OB) an image carrier (BT) is installed, to carry an image reception surface (BA), which, in like manner to the said objective lens, is pivotable about two axes. This reception surface (BA), during the installation has a frosted glass, i.e. a screen, inserted. Also, the pivoting angles of said reception surface and screen ($\alpha$, $\beta$) are communicated to the processor (PR) as above. Further, these pivotings are, if necessary, controllable by electrically controlled drives.

In the image reception surface is a positionable CCD-sensor (CD), by means of which, when called upon, two relative positional coordinates (Y1*, Z1*) on the screen can be communicated to the processor (PR). These positional coordinates can be taken from a positioning device of the CCD-measuring sensor (CD). Beyond this, the CCD-measuring sensor (CD) imparts focusing relevant, image point brightness signals (SS) of the currently selected area to the processor (PR) for evaluation of a focus criterion in conventional manner by means of a Fourier analyzer (FA).

The image carrier (BT) is mounted axially adjustably on the bench (OB) with an extension apparatus (AA), this also providing an adjustment signal to the processor (PR) which is interpreted as the extension distance. The extension adjustment apparatus (AA) has, if necessary, an electrically controlled drive, which is controlled by the processor (PR).

For an over view of the method of operation of the camera focusing adjustment, a Cartesian coordinate system has been drawn in, the X-axis of which runs through the principal point (H) of the objective lens (O) and parallel to the bench (OB). In case a pivotable bench is provided, the angular deviation of this with reference to the standard must be taken into consideration by an appropriate coordinate transformation. Extending upward is the Z-axis while the Y-axis extends sidewards. In the simplest case, three real subject points (S1, S2, S3) are to be sharply imaged on the image reception surface (BA) and arranged in a definite perspective, one to the other.

In the manual presetting by hand, the three real points (S1, S2, S3) lie generally in a starting image surface which deviates from the screen and the corresponding three image points (B1, B2, B3). In the example, the first image point (B1) with the positional coordinates (Y1*, Z1*) is focused sharply on the screen by the sensor (CD). The second and third image points, (B2, B3) lie outside of the screen.

From this originating basic positioning, in the course of the process, the focusing adjustment is undertaken. For this said adjustment, repeated extension alterations are made, with the aid of the positioning of the CCD sensor (CD), on the second image point (likewise the third) which at the start is still not sharply seen on the screen, until sharp focus is attained. Thereby arise the extension difference data (x1–x2, x2–x3) for the position of the points in the X-direction. Now, the Y* and Z* position coordinates can be computed back to the screen, given the image carrier angle placements ($\alpha$, $\beta$) in relative coordinates which describe the inclination of the original image plane.

For the further computations, it is foreseen to undertake an image distance determination, for which purpose, the objective lens (O) is pivoted about a given angle ($\theta$) and a previously sharply adjusted measuring point is refocused anew, whereby the distance of extension change ($\delta b$) is determined. With the inclusion of the objective lens focal length (f), which is customarily transferred in electrically coded form from said lens to the processor (PR), the output signals ($\theta_{soll}$, $I_{soll}$, $xb_{soll}$) ("soll" meaning "set value") which are valid for the angular deviation of the image points into the new image plane parallel to the screen and their corresponding parallel displacement in the X-direction, these can be computed into said plane and determined.

In FIG. 2, the dependency of the image distance (b) on the extension difference ($\delta b$) is illustrated. Both quantities are normalized as to the focal length (f), whereby the graph becomes independent of (f). The pivot angle runs (from top to bottom):

$\theta = 2°, 5°, 7°, 10°, 15°, 20°, 25°$ and $30°$.

The greater the pivoting angle, just so much better can the the image distance be determined, since a small image distance calls up a large extension difference. If an individual value $b_f$ is known, and for this, $b_f$ does not allow itself within the bounds of measurement technology, to be greater than 1, and this serves for the corresponding (very large) subject distance $s_f$.

$$\frac{s_f}{f} = \frac{\frac{b_f}{f}}{\frac{b_f}{f}+1} \text{ where } b_f < 0, s_f > 0 \qquad (12)$$

With this subject distance, $s_f$ can be found immediately as the image distance without further measuring of the focal distance (f).

The new type of apparatus requires thus no special lineal distance measuring equipment for the measurement of the objective lens to the screen interval distance. Accordingly, such an interval value or an image scale or the like are not present for input to the processor, since they have been replaced by the extension difference measurement. The means of measurement already provided were employed. The new computational procedure does not require the measurement of the absolute interval between the image points and the objective lens.

Adjustment of the angle and the extension in the data acquisition procedure can be carried out manually, whereby the focus value will be displayed by the processor, and, if required, the processor can output electrical positioning signals automatically. The input of the set-angle and the set-extension, i.e., the final corrected values thereof, can also be done by hand on the basis of processor produced placement displays or, if desired, be done directly by electric positioning means through said processor.

FIGS. 3 and 4 show error graphs for an objective lens with a 65 to 1800 mm focal length, whereby an extension precision of 10 $\mu$m and an angular accuracy of 1' are assumed. Further, a pivoting angle of $\theta = 5°, 7°, 10°, 15°, 20°, 25°$ and $30°$ have been chosen as parameters. In the case of sizable pivoting angles, error, even in the case of large focal lengths is held at a low value. Since, however, relatively large extension lengths are to be measured in these procedures, it has proved advantageous, if, using the extension distance (AW) which said distance can be found with the required precision in accord with measurement technology, the x-coordinate determinations are taken therefrom employing a combination of a roughly incremental sample, but an exact standard of measurement. For this purpose, the optical bench (03), FIG. 1, is provided with a mechanical incremental means, i.e. a regularly perforated, linear raster (L1–L2) that serves the incrementally exact positioning of the objective lens carrier (OT) and the image carrier (BT) on said optical bench by pin insertion.

Also, several bench sections (OB1, OB2) may be incrementally exactly linked together by means of pin insertion in the perforated segments. The x-coordinate determination is done thus, first as shown with a relatively large error, whereafter a resetting into the next neighboring incremental section is made and, in the corresponding raster measurement the remainder from the found raster point is added on, so that the absolute total error is only a little larger than that of the extension distance. This also permits working with small pivoting angles $\theta$ in the case of small extension distances, whereby, in spite of all, a high precision of the image distance determination is achieved.

The raster length will, in practice, be chosen smaller than the length of the extension distance, and a multiple greater than the greatest absolute error, which arises upon a given pivoting angle.

Through the hole and pin raster, there arises another alternative for indirect image distance or scale determination, in that the objective lens carrier (OT) is displaced by at least one increment length and before and after a focus point of a real point is made, whereby the extension length is ascertained.

The incremental divider on the optical bench and the related incremental devices on the standards and the bench connections are advantageous developments of the camera arrangement for the application of the of the new process of focusing placement.

As already mentioned, the given formulae extend themselves in the case of objective lenses with several principal planes. Besides this, it must be taken into consideration that the pivoting of the objective lens is often not about a principal plane axis, but parallely offset therefrom. By means of the interval $d_h$ the principal plane yields a parallel offset h to the image plane in the direction out from the objective lens from the relationship $h = d_h \cos \alpha$ From this, can be evolved the parameter of the displaced image plane:

$$d_m^v = \qquad (13)$$

$$d_m - h\sqrt{a_m^2 + b_m^2 + 1} = d_m - d_h(a_m\cos\Phi\cos\theta + b_m\sin\Phi\cos\theta - \sin\theta)$$

By conversion computing to the pivot point coordinate system, the parameters-of which are indicated with the raised "h" index, and upon introduction of the set-point objective lens pivot angle, there is obtained the extension adjustment for the doubled focus placement as seen in:

$$x_b = -\frac{d_m^v}{a_m} + \frac{d_h}{a_m}(a_m\cos\Phi_p\cos\theta_p + b_m\sin\Phi_p\cos\theta_p - \sin\theta_p) \qquad (14)$$

and for the Z-axis section:

$$d_m^v = d_m^H + a_m A_1 \cos\phi_p \cos\theta_p + b_m A_1 \sin\theta_p \cos\theta_p - a_I \sin\theta_p \qquad (15)$$

Wherein, $A_1$ is a displacement parameter and wherein the index sub "p" always represents the "set point" index in other equations.

In the above, various methods of solving are presented for the computation of the set-point adjustment value. In the case of the greatest simplification of the formulae, which are valid for the thin lenses, the differential relationship of the extension distance to a objective lens pivoting angle alteration is brought into the equations and a final solution for the sought after set-point position value results.

If more complex equations are applied, which produce a more exact definition of the image system, then two kinds of considerations for the solution of the equations appear. In the case of one method, for the related parameter pairs of the extension upon focusing, that is, the start extension and the start pivoting angle, are brought, as indeterminate quantities into a first equation system. The final extension, which is defined from the indeterminate values and the extension change, along with the final pivoting angle, is input into a second equation system. Then, by setting the two systems equal to one another, the indeterminate quantities eliminate themselves and the equations, because of their complexity cannot be normally solved, but in accord with known iteration methods the set points can be found. The equivalence setting of the two image side parts of the equation systems is possible, because the two object side portions of the equation systems in relation to the adjustment changing are invariant.

A further method does not proceed from two approaches together with the related equation systems, but from an entirely different point of view of the image equation system. The evolved results and the equations regarding the parameters to be varied, i.e. that of the variation dependent parameters, yield further equations, with the inserted real quantities of the measured dependencies, which equations are to be solved by the iteration method, in such a manner that the sought set-point values are found.

The determination of the mutual dependencies of the objective lens adjustment to the extension changes at any given time upon focusing, is technologically very simple to bring about without giving rise to image migrations.

This is the case when the objective lens is pivoted about a clearly defined pivoting axis which intersects with the optical axis at a definite point or in a closely localized zone. This zone lies, according to the type of objective lens, midway between the principal planes up to the plane H' and, is determinable for the conventional installation of an objective lens. The pivoting of the objective lens can be made about the optimal axis, when the said optimal axis does not coincide with the mechanical pivoting axis. This is accomplished by means of appropriate compensation displacements virtually about the optimal axis, which requires, however, corresponding calculation of the compensation displacement and related means of positional adjustment.

A particularly simple adjustability of the objective lens arises, when the optimal angular displacement axes coincide with the mechanical pivoting axes. To this end, the mechanical pivoting axes must meet with the optical axis at one point, and the objective lens must be so set in the objective lens standard, that its optimal pivoting axes conform with the mechanical pivoting axes.

As may be inferred from FIGS. 5, 6, and 7, it is advantageously arranged, that between the lens holding elements (HR) of the objective lens holder (OT) currently an adapter set (E1–E3) is installed, so that the framing reference surface (SOS) exhibits a definite axial backstop to the current objective lens reference surface (BF01–BF03) and in accord with this, the pivoting axis (Y) of the objective lens carrier (OT) lies properly in the objective lens.

In the case of the first adapter (E1) in FIG. 5, the objective lens is displaced in the direction of the subject. Where the second adapter (E2) is concerned, there is no axial positioning beyond the customary placement. In the third adapter (E3) arrangement, the objective lens is moved toward the screen. The various adapter inserts (E1, E2, E3) are thus flat or extend themselves inward or outward from the retaining frame (HR).

The understanding that the exceptional focussing, which is in accord with the purpose of the invention, of an already, prealigned, partially focussed image, requires only a refocussing of the camera within confined limits, was made use of. That is, in accord with the invention, subsequent to the determination of the gradients of the positioning parameters, with the aid of these said gradients, the necessary further parameters are solved for through iterative computation. In this process, and in a provable manner, a satisfactory precision is achieved.

The utmost sharp focussing, in accord with the process, now permits, as has been shown, the use of optimal aperture openings, which are chosen, on the one hand, to correlate the required depth of focus at moderate light requirement and on the other hand to avoid extensive diffraction blurring.

I claim:

1. A focusing process for a camera;

having an objective lens carrier (OT) and an image carrier (BT), which are maintained positionally relative to one another in a straight line optical bench direction (X) in which the spatial interval (x1–x2, x2–x3, δb) between them is variable, wherein the said interval changes are signaled to a microprocessor (PR), equipping the objective lens carrier (OT) with an objective lens (O) secured to pivot about two axes (Y, Z), said axes being perpendicular to one another and to an optical bench direction (X), two respective objective lens angles (θ, Φ) and a focal length (f) of said objective lens being inputted to the microprocessor (PR), the image carrier (BT) having a frosted glass plate image screen (BA), said screen being moveable about the two axes (Y, Z) perpendicularly disposed to one another and to the direction of the bench direction (X), and two respective image reception angles (α, β) thereof being sent to the microprocessor (PR), the image screen (BA) having a focusing adjustment sensor (CD), which signals a degree of focus, and is positionable in two image reception coordinates (Y1*, Z1*) which, together with a focus value, are inputted to the microprocessor (PR), further possessing at least three select image point areas (B1, B2, B3), which lie in a secondary image plane for the simultaneous adjustment of a focus having said image point areas and the focus adjustment sensor (CD) on the image screen (BA) subjected to determination of their respective image screen coordinates by means of a change in the interval between the image carrier (BT) and the objective lens (O) sequentially at a current time for each area of said image point areas through focus adjustment by means of the determination of the related screen coordinates (Y2*, Z2*, Y3*, Z3*), and said positional changes of the image carrier (BT), these being (x1–2x, x2–x3) and being inputted to the microprocessor, obtaining, by means of input data collected from the microprocessor (PR) a determination of the positional parameters ($a_o$, $b_o$, $a_m$, $b_m$, $\theta_o$, $\Phi_o$) of the image screen (BA) as well as of the secondary image from which, together with a further image parameter necessary for computation, this latter originating in the solution of image equations, calculating such set point adjustment values ($\theta_{soll}$, $\Phi_{soll}$) suitable for the pivoting of the objective lens carrier (OT) along with a value for the adjustment of the interval between the image carrier (BT) and the objective carrier (OT), and the results thereof being made available, so that the new image plane adjusted by these set-point values ($\theta_{soll}$, $\Phi_{soll}$, $xb_{soll}$) comes as close as possible to coinciding with the image screen (BA), therein characterized, in that one of the objective lens focusing adjustment parameters ($\theta$, $\Phi$, axial displacement) is altered by a predetermined amount, thus allowing a condition wherein, for a selected image point, can be measured an extension difference, which distance is determined by an extension apparatus AA in the bench direction (X) and a first set of the image equations with the input of the original objective lens adjustment parameters and an undetermined image distance (b) as well as a further set of image equations with the input of varied objective lens parameters ($\theta$, $\Phi$) and compensated by the image distance (b), changed by an extension difference ($\delta b$) and permitting determination of the set point values ($\theta_{soll}$, $\Phi_{soll}$, $xb_{soll}$), functional derivations of the image equations having been created in regard to the objective lens focusing parameters ($\theta$, $\Phi$, axial displacement) and in regard to the current image distance (b) in accord with the focus at the time and the thereby arrived at focus change ($\theta$, $\Phi$, axial displacement) and the measured extension difference ($\delta b$), being inputted to the said derivations and solved for the set point signals ($\theta_{soll}$, $\Phi_{soll}$, $xb_{soll}$).

2. A process in accord with claim 1, therein characterized, in that the selected image point, where the objective lens (O) has not been pivoted about the horizontal axis (Y) and lies in the horizontal XY-plane and the pivoting of the objective lens (O) takes place about the said horizontal axis (Y) by a predetermined pivoting angle ($\theta$) for the determination of the extension difference.

3. A process in accord with claim 1, therein characterized, in that the selected image point, is focussed by at least two pivoting angles and thereby the extension differences (AW) are measured and from a related equation (11) by means of which, through parameters, a real object distance (S) and therefrom the image distance (b) is calculated, which are inputted to the image equations for the solution thereof.

4. A process in accord with claim 1, therein characterized, in that during an extension change, the current incremental extension changes from the image point signals (SS) of the corresponding focussing values of the selected image point are continually monitored and correspondingly stored in the microprocessor (PR) memory, and subsequent to the pivoting of the objective lens about the predetermined pivoting angle ($\theta$), or after an objective lens displacement along given axial movement path, from the then produced image point signals (SS) the focus value is determined and, now having this value, from the stored data, the corresponding extension change ($\delta b$) is sought out, which serves for further computations.

5. A process in accord with claim 1 therein characterized, in that the image distance (b) is first approximated from the extension difference ($\delta b$) and the closest related raster incremental interval of the image carrier (BT) of a linear bench raster (L1–LN) from the objective lens carrier (OT) is determined to this so attained raster interval the extension differential, also corresponding to the raster, is added and this so computed image carrier-objective lens carrier interval is used for a more exact further image parameter in sequential computations.

6. A process in accord with one of the claims 1, 4 or 5, therein characterized, in that the objective lens displacement path amounts to one or more to the bench raster lengths.

7. A process in accord with claim 1 therein characterized, in that by means of image equations, the start image plane (B1, B2, B3) in the image space is on a new image plane, which is parallel to the image screen (BA), and will be brought back and the objective lens angles ($\theta_{soll}$, $\Phi_{soll}$) and subsequently the inserted intersection point ($xb_{soll}$) of the image reception plane (BA) is calculated with the X-axis.

8. A process in accord with claim 1 therein characterized, in that a parallel insert (h) of the image plane, dependent on a main lens plane interval ($d_h$) of the objective lens and an insert of the objective lens pivoting axis intersection point for the principal plane thereof, is taken into consideration in the computation for the set-point values ($\theta_{soll}$, $\Phi_{soll}$, $xb_{soll}$).

9. A camera for application with a focusing process in accord with claim 1 therein characterized, in that the bench thereof (OB) is provided with a raster with mechanical increments, in particular, hole and space increments, (L1–LN) and the objective lens carrier (OT) and the image carrier (BT) with raster apparatus are secured incrementally exact to one another in the said raster with appropriate means, namely raster pins.

10. A camera in accord with claim 9, therein characterized, in that the optical bench (OB) is comprised of at least two bench sections (OB1, OB2), which are joined in exact incremental exactness by a connection piece possessing a raster apparatus for the given raster.

11. A camera in accord with claim 9, therein characterized in that the raster length is shorter than a maximum extension path length.

12. A camera for application with a focusing process in accord with claim 1 therein characterized, in that the objective lens (O) is so placed in the objective lens carrier (OT), that the pivoting axes (Y, Z) of said lens intersect at a point and the point of intersection lies between the two principle planes (H, H') of the objective lens (O) .

13. A camera in accord with claim 12, therein characterized in that the intersection point for the axes (X, Y, Z) lies between the midpoint and the principal plane (H'), which said midpoint lies between the two principal planes (H, H').

14. A camera in accord with claim 12, therein characterized in that between the objective lens carrier (OT) and the objective lens (O), a corresponding and suitable insert (E1, E2, E3), which possesses an axial partition between the image reception surfaces (BF01, BF02, BF03, SOS) of the objective lens (O) and the objective carrier (OT), is placed in such a manner that the intersection point of the axes (X, Y, Z) is found in the optimal axial position for the objective lens (O) being used at that time and said point is between the principal planes (H, H').

* * * * *